Sept. 16, 1947.    W. D. ALLISON    2,427,340
STEERING MECHANISM
Filed July 18, 1944    3 Sheets-Sheet 1

Inventor
William D. Allison
By C. E. Kerrstrom & H. E. Thibodeau
Attorneys

Sept. 16, 1947. W. D. ALLISON 2,427,340
STEERING MECHANISM
Filed July 18, 1944 3 Sheets-Sheet 2
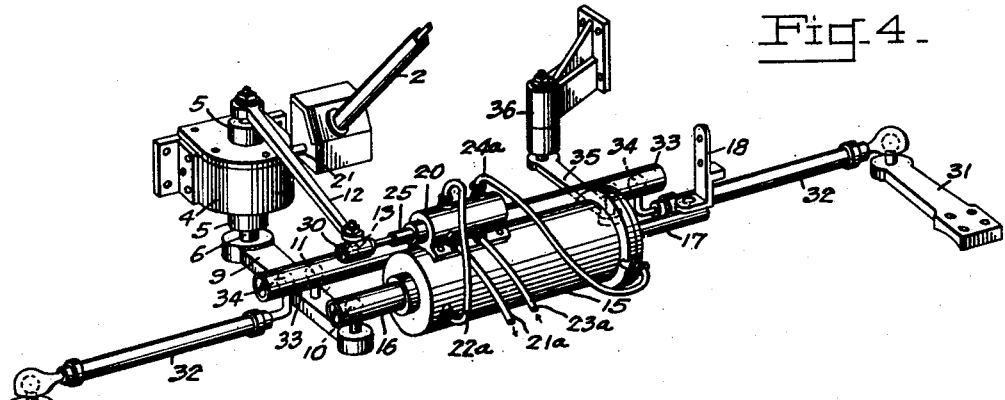
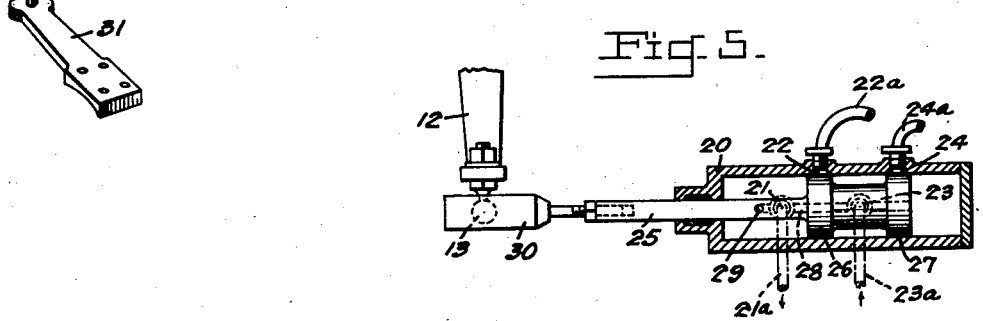
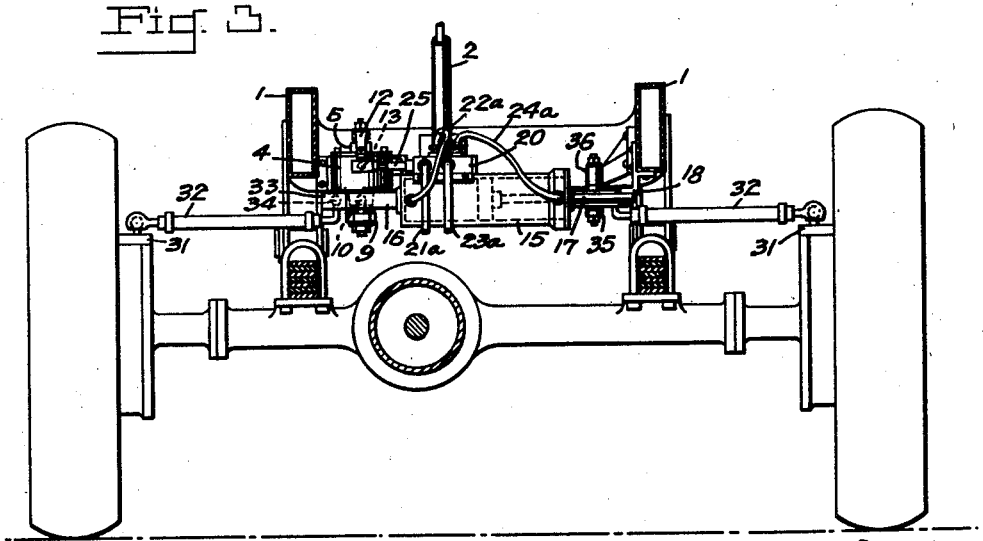
Inventor
William D. Allison Sept. 16, 1947.   W. D. ALLISON   2,427,340
STEERING MECHANISM
Filed July 18, 1944   3 Sheets-Sheet 3

Inventor
William D. Allison
By C. E. Herrstrom + H. E. Thibodeau
Attorneys

Patented Sept. 16, 1947

2,427,340

UNITED STATES PATENT OFFICE 2,427,340

STEERING MECHANISM

William D. Allison, Detroit, Mich.

Application July 18, 1944, Serial No. 545,527

13 Claims. (Cl. 180—79.2)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel steering mechanism designed for power steering of heavy vehicles. The invention is not necessarily limited to land vehicles and may readily be adapted to actuate a rudder.

The principal object of the invention is to utilize the deformation or torsional twisting of the steering gear cross shaft to actuate the controlling element of the power apparatus, the latter being operative on the steering mechanism. More specifically, the cross shaft is connected at one point to the manually actuated steering gear. Another point of the shaft is mechanically connected to the steering linkage. A torsional stress in the shaft between these two points occurs by reason of the difference in loads or resistance at these points. The stress manifests itself by a turning of the shaft at the point of less load or resistance, and this movement is utilized to control the power mechanism operating on the steering linkage. For example, if the power mechanism is a hydraulic cylinder, the control valve therefor is connected for operation by the less resisted part of the cross shaft.

An illustrative embodiment of the invention is disclosed in the following description and in the accompanying drawings in which:

Figure 3 is a cross section taken on the plane indicated by the line 3—3 of Figure 1;

Figure 4 is a perspective view of the steering mechanism;

Figure 5 is a vertical cross section through the valve control cylinder;

Figure 1:
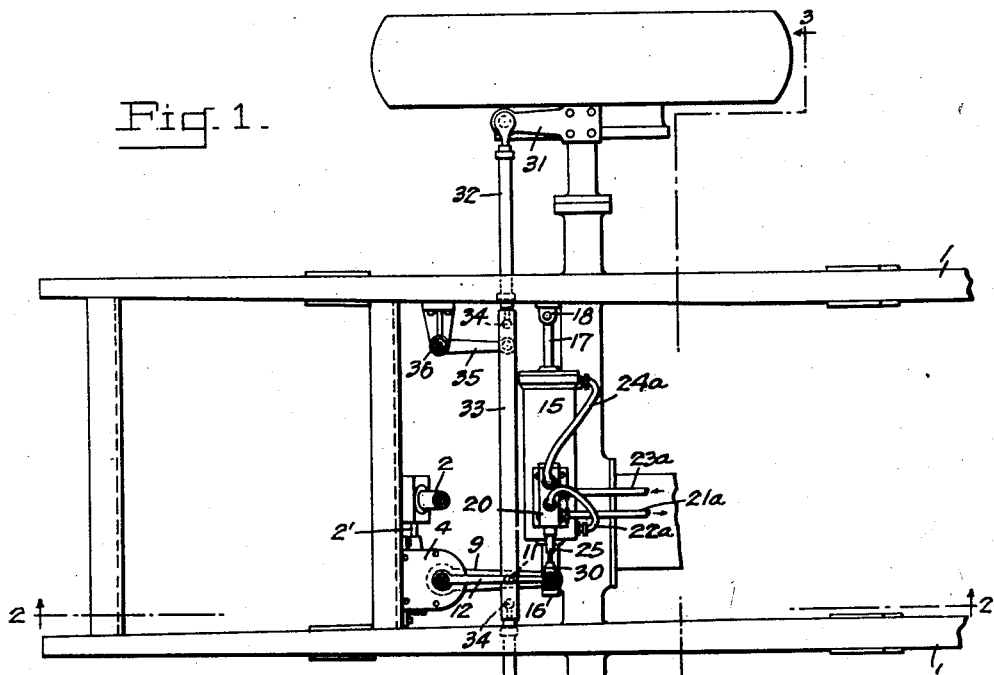
Figure 1 is a plan view of a portion of a vehicle including my novel steering mechanism.
Figure 2:
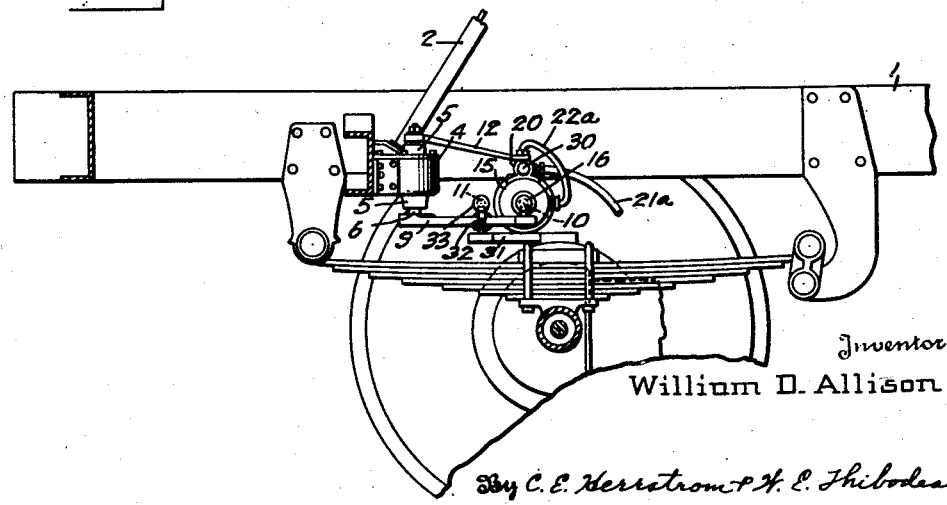
Figure 2 is a cross section taken on the plane indicated by the line 2—2 of Figure 1.
Figure 6:
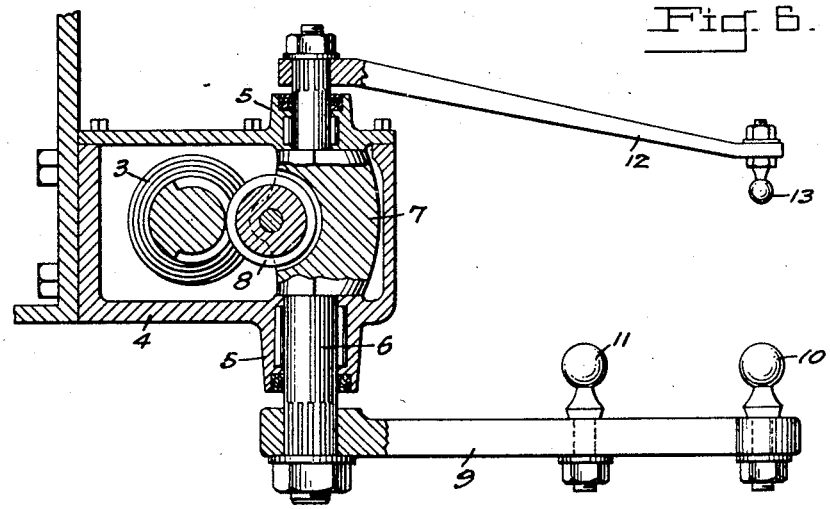
Figure 6 is a vertical cross section through the gear box.
Figure 7:
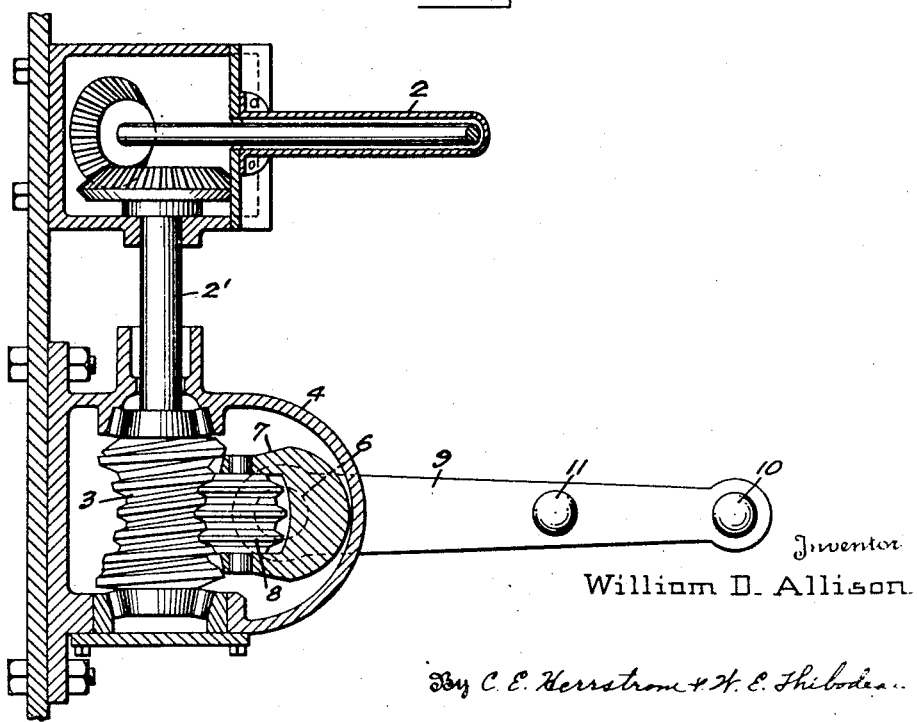
Figure 7 is a horizontal cross section through the gear box.

In Figure 1 is shown the frame 1 of a motor vehicle carrying the usual steering column 2. The lower end of the steering column is geared to an extension 2' and the extension formed with a worm 3 is received in a suitably supported gear box 4. The gear box or housing 4 has a pair of lateral alined bearings 5 in which is journalled a cross shaft 6. This shaft is formed with an intermediate yoke 7 in which is journalled a so-called roller tooth 8 axially parallel with the worm 3 and meshing with the worm 3 as shown in Figure 7. One end of the cross shaft 6 carries a pitman arm 9 on which are mounted a pair of balls 10 and 11 respectively at and near the free end of the arm, for a purpose that will presently be described. From the other end of the shaft 6 extends a somewhat similar pitman arm 12 also carrying at its outer end a ball 13.

A hydraulic cylinder 15 is supported rearward of the gear box 4 and transversely of the vehicle. From the closed end of the cylinder extends a fixed stem 16 socketed on the ball 10. The piston rod 17 projecting through the other end of the cylinder 15 has its free end pivotally attached to the frame 1 by means of a suitable bracket 18. The piston rod 17 is not axially displaceable, hence the cylinder 15 and stem 16 are displaced as will presently be shown.

A valve control cylinder 20 is mounted on top of the cylinder 15. The wall of the cylinder 20 has a series of four ports 21, 22, 23 and 24 spaced apart an appreciable distance as shown in Figure 5. The valve stem 25 extending into the cylinder 20 has a pair of valve heads 26, 27 adapted to cover the two ports 22 and 24 or uncover the ports when moved axially. The ports 22 and 24 are connected by piping 22a and 24a respectively to the ends of the cylinder 15. The ports 21 and 23 are connected by piping 21a and 23a respectively to a reservoir and a fluid pump (not shown). From the inner end of the valve stem 25, a duct 28 is drilled inward and branched radially at 29 at a point on the outer side of the valve head 26. This system relieves to the reservoir the fluid trapped between the valve head 27 and the blind end of the cylinder 20. An extension 30 on the outer end of the valve stem 25 is socketed on the ball 13 of the pitman arm 12 as shown in Figure 5.

At the sides of the vehicle are the usual steering arms 31 extending to the steered wheels. To the forward end of each steering arm is universally joined a drag link 32 extending inwardly and transversely of the vehicle. The inner ends of the drag links are connected to one another by a tie rod 33 having universal joints 34 with said ends. One end of the tie rod is mounted on the ball 11. The other end of the tie rod is similarly supported by a support arm 35 extending generally parallel to the pitman arm 9 and having its forward end pivotally mounted in a suitable bracket 36 attached to the frame 1.

In the operation of the device, turning of the steering wheel applies torque to the worm 3 which in turn applies torque to the steering gear cross shaft 6. The amount of torque applied to the cross shaft is determined by the resistance of the front wheels and the steering mechanism. Any torque applied to the steering wheel produces angular deformation or twisting in the cross shaft and bending in the pitman arm 9. The bending and twisting are proportional to the torque applied.

Referring particularly to Figure 4, it will be observed that in turning the vehicle to the right the steering gear cross shaft 6 is rotated in a counterclockwise direction (when viewed from above) and effects a corresponding counterclockwise rotation of the main pitman arm 9 and the control pitman arm 12. If there were no torsional twisting in the cross shaft or bending in either of the pitman arms the power apparatus would be inoperative since there would be no relative movement between the valve control cylinder 20 and the valve stem 25. However, the resistance of the front wheels to turning resists the rotation of the main pitman arm 9 and causes angular deformation or twisting in the lower portion of the cross shaft 6 and a bending in the main pitman arm 9 in a clockwise direction. Inasmuch as the load upon the control pitman arm 12 is very light, it bends very little and there is a relative angular movement between the two pitman arms. When turning to the right this difference in angular movement results in the outer end of the control pitman arm moving farther to the right in Figure 4 than the outer end of the main pitman arm 9. Since the valve control cylinder 20 is directly connected to the outer end of the main pitman arm 9 and the valve stem 25 is directly connected to the outer end of the control pitman arm 12, the valve stem is moved to the right relative to the cylinder. As best seen in Figure 5, this places the intake port 23 in communication with the port 24, and the exhaust port 21 in communication with the port 22. Fluid from the reservoir (not shown) is supplied by the pump (not shown) under pressure to the intake port 23 through the piping 23a and is directed by the valve through the port 24, and piping 24a to the right hand end of the hydraulic cylinder 15. The pressure in the cylinder 15 results in displacement of the cylinder to the right relative to the fixed piston rod 17, and the tie rod 33 is thereby shifted to the right, actuating the drag links 32 and the steering arms 31 in the usual manner, thus steering the vehicle to the right.

During displacement of the cylinder 15 to the right, the left hand end of the cylinder is exhausted through piping 22a, port 22, valve 20, outlet port 21, and piping 21a to the reservoir.

When the vehicle is turned to the left, the above described operation is reversed. The cross shaft 6 and the pitman arms are rotated in a clockwise direction, and the load causes the cross shaft 6 to be twisted and the main pitman arm 9 to be bent in a counterclockwise direction relative to the control pitman arm 12, resulting in a movement of the valve stem 25 to the left in Figure 5 relative to the valve control cylinder 20. Inlet port 23 is placed in communication with port 22 and supplies fluid under pressure to the left hand end of cylinder 15 through piping 22a, displacing the cylinder 15 and the tie rod 33 to the left and steering the vehicle to the left. At the same time the right hand end of the cylinder 15 is exhausted through piping 24a to port 24 and through the duct 28 and port 29 in the valve stem to the outlet port 21 and thence to the reservoir through piping 21a.

The valve body 20 moves with the cylinder 15. Consequently the valve has returned to neutral position when the torsional stress and deformation in the cross shaft 6 and the steering arm 9 has been removed. Steering action is resumed on further turning of the steering wheel or, in other words, the total amount of steering is dependent on the total turning of the steering wheel.

The mechanical construction of the valve mechanism permits a small amount of leakage and thus permits the mechanism to be slowly reversible when forces are applied from the front wheels. This is an important factor in handling so that the vehicle is properly responsive to road conditions. For quick jolts, bumps, wheelfight and shimmy, the steering mechanism is practically irreversible.

The power cylinder may be designed to furnish any desired portion of the power required to steer the vehicle. The steering gear for a very large vehicle may be quite small inasmuch as its only function requiring strength would be to serve as a fulcrum support bearing for one end of the main pitman arm. If desired, the steering wheel and column may be constructed of passenger car size and designed for "finger tip" control.

While a specific embodiment of the invention has been shown and been described, it will be understood that various alterations may be made without departure from the spirit of the invention as indicated by the appended claims.

What I claim is:

1. In a steering mechanism, steering linkage, a movable element capable of bending and operatively connected to said linkage means for manually moving said element, said means tending to bend said element when said element is moved, power means connected to said linkage for supplying part of the force required for steering, and control means connected to said element and responsive to such bending of said element for operating said power means.

2. In a steering mechanism, steering linkage, a movable element operatively connected to said linkage, means for manually actuating said element to supply part of the force required for steering, said means imposing a stress on said element tending to deform the latter, when said element is actuated by said actuating means, power means connected to said linkage for supplying additional force for steering, and control means connected to said element and responsive to such deformation of said element for operating said power means.

3. In a steering mechanism, a cross shaft, means for manually turning said shaft, steering linkage, a connection from said shaft to said linkage, a power-actuated member joined to said connection and adapted to operate it, a control element for said power member, a driving connection between said shaft and said element and secured to the shaft at a distance from the first connection, the load on the second connection being less than on the first connection during operation of the steering mechanism and tending to twist said shaft, when said shaft is actuated by said turning means, and said control element being responsive to such twisting of said shaft to operate said power member.

4. In a steering mechanism, a cross shaft, means for turning said shaft, steering linkage, a driving connection from said shaft to said linkage, a hydraulic apparatus having a movable element joined to said connection and adapted to operate it, a valve for said apparatus and including a movable member adapted to actuate said element in either direction, a driving connection between said shaft and said member and secured to the shaft at a distance from the first connection, the load on the second connection being less than on the first connection during operation of the steering mechanism and imposing a torsional stress in said shaft, when said shaft is actuated by said turning means, and said valve being responsive to such torsional stress in said shaft to operate said hydraulic apparatus.

5. In a steering mechanism, a cross shaft, a pair of spaced arms extending therefrom, means for turning said shaft, steering linkage extending from one of said arms and adapted for operation by said arm, a power-actuated member connected to the same arm, a control element for said power member connected to the other arm, said first arm being subjected to a greater load during the steering operation than said second arm and tending to twist said shaft, when said shaft is actuated by said turning means, and said control means being responsive to such torsional twisting of said shaft to operate said power member.

6. In a steering mechanism, a cross shaft, a pair of spaced arms extending therefrom, means for turning said shaft, steering linkage extending from one of said arms and adapted for operation by said arm, a hydraulic apparatus having a movable element connected to the same arm, a valve for said apparatus and including a movable member adapted to actuate said element in either direction, said movable member being connected to the other arm, said arms being subjected to loads of different amounts during operation of the steering mechanism and tending to twist said shaft, when said shaft is actuated by said turning means, and said valve being responsive to such twisting of said shaft to operate said hydraulic apparatus.

7. In a steering mechanism, a cross shaft, means for turning said shaft, a pair of steering linkages, a tie rod connecting said linkages for joint operation, a driving connection from said shaft to said rod, a power-actuated member joined to said connection and adapted to operate it, a control element for said power member, a driving connection between said shaft and said element and secured to the shaft at a distance from the first connection, said connections being subjected to loads of different amounts during operation of such steering mechanism and tending to deform said shaft, when said shaft is actuated by said turning means, and said control element being responsive to such deformation of said shaft to operate said member.

8. In a steering mechanism, a cross shaft, means for turning said shaft, a pair of steering linkages, a tie rod connecting said linkages for joint operation, a driving connection from said shaft to said rod, a power-actuated member joined to said connection and adapted to operate it, a control element for said power member, a driving connection between said shaft and said element and secured to the shaft at a distance from the first connection, said control element being mounted on and movable with said power-actuated member, the load on the second connection being less than on the first connection during operation of said steering mechanism and tending to deform said shaft, when said shaft is actuated by said turning means, and said control element being responsive to such deformation of said shaft to operate said power member.

9. In a steering mechanism, a cross shaft, a pair of spaced arms extending therefrom, means for turning said shaft, a pair of steering linkages, a tie rod connecting said linkages for joint operation, one of said arms being connected to said rod, a power-actuated member connected to the same arm, a control element for said power member connected to the other arm, said first arm being subjected to a greater load during the steering operation than said second arm and tending to twist said shaft, when said shaft is actuated by said turning means, and said control means being responsive to such torsional twisting of said shaft to operate said power member.

10. In a steering mechanism, a cross shaft, a pair of spaced arms extending therefrom, means for turning said shaft, a pair of steering linkages, a tie rod connecting said linkages for joint operation, one of said arms being connected to said rod, a power-actuated member connected to the same arm, a control element for said power member connected to the other arm, said control element being mounted on and movable with said power-actuated member, said first arm being subjected to a greater load during the steering operation than said second arm and tending to twist said shaft, when said shaft is actuated by said turning means, and said control means being responsive to such torsional twisting of said shaft to operate said power member.

11. In a steering mechanism, steering linkage, power means connected to said linkage for supplying part of the power required for steering, control means for said power means, a movable member connected to said linkage, a second movable member connected to said control means, an operative shaft connecting said members means for manually turning said shaft, said first member having a smaller movement than said second member during operation of said steering mechanism due to the first member being deformed by the resistance to movement of the first member provided by the load on the steering linkage, and said control means being responsive to the difference in movement between said first and second members to operate said power means.

12. In a steering mechanism, steering linkage, power means connected to said linkage for supplying part of the power required for steering, control means for said power means, a shaft, means for turning said shaft, an arm keyed on said shaft and connected to said linkage, a second arm keyed on said shaft and connected to said control means, said first arm having a smaller angular movement than said second arm during operation of said steering mechanism due to the resistance to movement of said first arm provided by the load on said steering linkage, and said control means being responsive to the difference in angular movement between said first and second arms to operate said power means.

13. In a steering mechanism for a vehicle having steerable wheels and steering linkage therefor, the combination of power means supplying part of the force required for steering; control means for said power means; a manually actuated element capable of being twisted and connected to said linkage, to said power means, and to said control means, said element being twisted by reaction against said linkage and wheels, when the element is manually actuated, and said control means being responsive to such twisting of the element.

WILLIAM D. ALLISON.

REFERENCES CITED

The following references are of record in the file of this patent:

UNITED STATES PATENTS

| Number | Name | Date |
|---|---|---|
| 818,967 | Jenkins | Apr. 24, 1906 |
| 1,639,284 | Bragg et al. | Aug. 16, 1927 |
| 2,061,120 | Vorech | Nov. 17, 1936 |
| 2,152,021 | Baumer | Mar. 28, 1939 |
| 2,062,485 | Turek | Dec. 1, 1936 |